J. A. GARDNER.
COTTON SEED CRUSHER AND DISTRIBUTER.
APPLICATION FILED FEB. 20, 1912.
1,029,987.
Patented June 18, 1912.
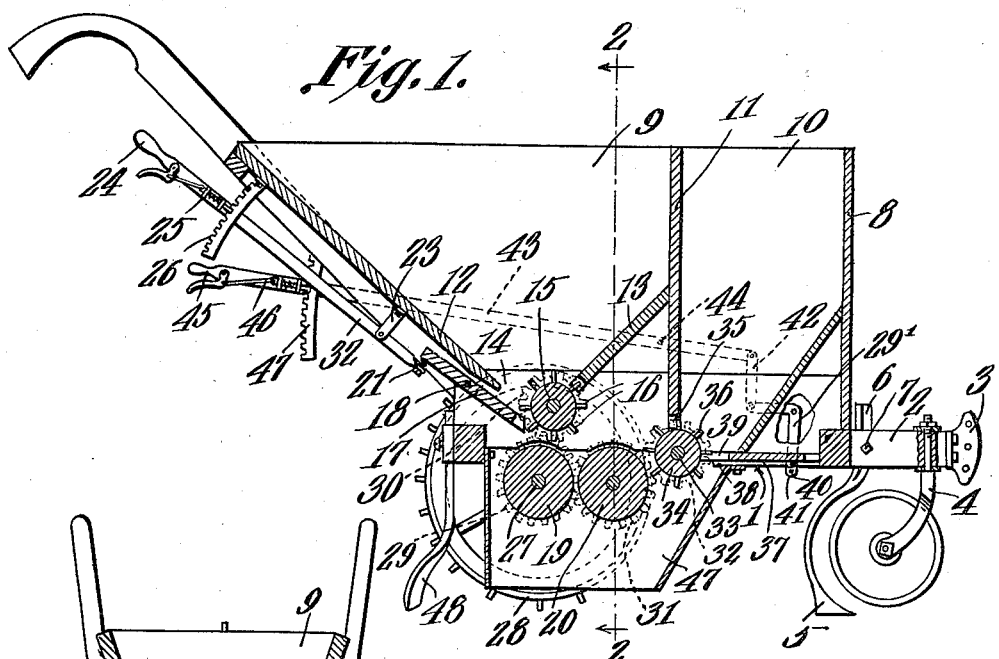
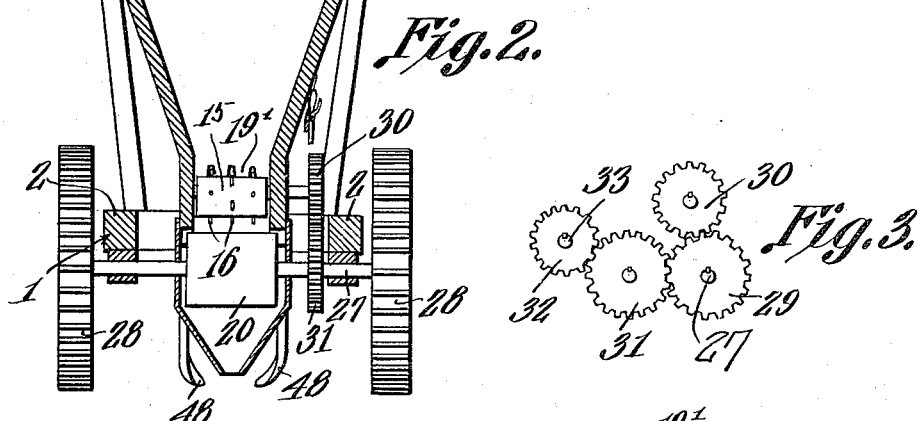
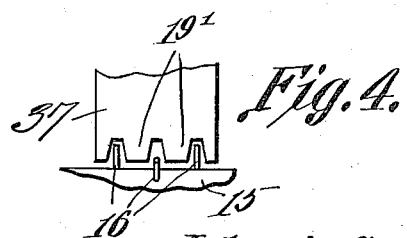
John A. Gardner,
Inventor
by C. A. Snow & Co.
Attorneys
Witnesses

UNITED STATES PATENT OFFICE.

JOHN A. GARDNER, OF GRIFTON, NORTH CAROLINA.

COTTON-SEED CRUSHER AND DISTRIBUTER.

1,029,987.     Specification of Letters Patent.    Patented June 18, 1912.

Application filed February 20, 1912. Serial No. 678,804.

*To all whom it may concern:*

Be it known that I, JOHN A. GARDNER, a citizen of the United States, residing at Grifton, in the county of Pitt and State of North Carolina, have invented a new and useful Cotton-Seed Crusher and Distributer, of which the following is a specification.

The present invention relates to improvements in seed crushers and distributers, the primary object of the present invention being the provision of a crushing apparatus especially designed for crushing cotton seed for utilizing the crushed seed for fertilizing purposes, the same being provided with traction wheels to operate a plurality of crushing rollers and a seed feeding roller disposed in the mouth of a hopper, the said seed feeding roller being provided with teeth and having disposed in operable relation thereto an adjustable plate for limiting the discharge of the seed by the toothed wheel, there being manually controlled means suitably disposed with relation to the handle of the implement for actuating the same.

A further object of the present invention is the combination of a hopper for controlling the seed and a fertilizer, such as lime or plaster, both hoppers being provided with a toothed feeding wheel at the outlet thereof in combination with adjustable plates for regulating the ports of egress for lime and plaster, and seed, the seed being passed to a pair of crushing rollers, while the lime or plaster will commingle with crushed seed within a distributing spout or boot, where the material will be deposited within a furrow formed by a furrow former and finally to be covered by a shovel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a longitudinal sectional view through the two compartment hopper and feeding and crushing roller, other portions of the machine being in elevation. Fig. 2 is a section taken on line 2—2 of Fig. 1. Fig. 3 is a side elevation of the gearing for operating the various feeding and crushing rolls. Fig. 4 is a detail view of one of the adjustable plates and one of the feed rolls.

Referring to the drawings, the numeral 1 designates the frame of the implement, which is provided with the beam 2 carrying the clevis 3 and the forward caster wheel 4, the furrow opener 5 being disposed for vertical adjustment within the frame 2 and having its squared upper end 6 held therewithin by means of the set screw 7.

Mounted upon the frame 1 is the main hopper 8, which is divided into bins 9 and 10, respectively, by means of the vertical partition 11, the bin 9 being the cotton seed holding bin while the bin 10 is the lime or plaster holding bin. The bin 9 is provided with the rear inclined wall 12 and the short forward inclined wall 13 which provides the outlet 14 for the seed, while journaled in the frame and transversely of the outlet 14 of the bin 9 and near to the end of the inclined plates 13 is the seed feeding roller 15, which is provided with a plurality of circumferentially disposed radial teeth 16.

In order to limit the port of egress for the seed, that is between the circumferential surface of the roller 15 and the adjacent portion of the outlet 14, the plate 17 is pivoted at 18 and carries upon its end adjacent to the roller 15, the teeth 19′, which as shown in Fig. 4, coact with the teeth 16 of the roller 15 to properly feed the seed to the crushing rollers 19 and 20 therebelow. In order to move the teeth 19′ to and from the feed roller 15 and thereby regulate the space between the teeth 16 and the periphery of the roller 15, the pin 21 carried by the upper end of the plate 17 has connected thereto the lower free end of the lever 32, which lever 32 is pivoted to the lug 23 carried upon the outer face of the rear inclined wall 12 of the bin 9. This lever is provided with the operating handle 24, which is disposed in accessible reach to the operator of the implement and carries the handle actuated spring pawl 25 which is disposed in operable relation to the toothed segment 26, whereby the lever 32 may be held at any desired adjustment to consequently govern the adjustment of the teeth 19′ with relation to the seed feeding roller 15. The main crushing roller 19 is carried upon the axle 27, which is journaled in the frame 1 and carries upon its respective ends the traction wheels 28. Keyed upon the shaft 27 is a gear 29, which is in mesh at all times with the gear 30 of the seed feeding roller 15 and with the gear 31 of the forward crushing roller 20, the gear 31 being in mesh with the gear 32 which is keyed upon the shaft 33 and rotates the feeding roller 34, which is disposed transversely of the outlet 35 of the lime or plaster containing bin 10. This roller 34 is provided with the peripheral teeth 36, similarly to the seed feeding roller 15. In order to limit the feed of the lime and plaster from the bin 10, the horizontal reciprocatory plate 37 is provided and mounted within the frame 1 below the hopper. The end of the plate 37 adjacent to the feed roll 34 is toothed, as at 39, and correspondingly to the teeth 19 of the plate 17, and in order to impart the desired movement to the plate and retain the teeth 39 in the desired adjustment with relation to the feed roll 34, a bell crank lever 29' is pivoted upon one side of the hopper with its lower free end in operable relation by means of the pin 40 to the plate 37, the upper free end of said bell crank lever being operably connected through a link 42 to the outer end of the operating lever 43 which is pivoted at 44 to the hopper. The handle 45 of the lever 43 is extended toward the main handles of the implement and in ready access to the operator, the handle operated pawl 46 being carried by the handle and disposed in operable relation to the segment 47, so that the plate 37 may be adjusted and held at any desired adjustment. By this construction and arrangement of adjustable plates 17 and 37, the feed of the seed to the crushing rollers and the fertilizer into the hopper 47 is regulated as desired, and by reason of the furrow former 5, and the covering teeth 48, the mixed crushed seed and fertilizer are properly distributed within the furrow and covered.

By mounting the gear 29 upon the main shaft 27 of the implement, all of the various rollers 15, 20 and 34 are operated through the shaft 27 which carries the main crushing roller 19. It will also be noted that the furrow former 5 is curved rearwardly so as to accommodate the caster wheel 4 and thus produce a shortening of the main frame and the consequent reduction in the longitudinal length of the implement.

What is claimed is:

1. In a seed crusher and distributer, a wheeled frame, a two compartment hopper carried thereby, each compartment being provided with a discharge outlet, a feed roll provided with a plurality of radial teeth mounted within each outlet of the compartments, a pair of feed crushing rolls disposed below the outlet of one of the compartments, one of said rolls being operated by a traction wheel, and means for operably connecting the crushing rolls and the feeding rolls thereto, and an adjustable plate one to each outlet disposed in coactive relation with its feed roll for regulating the feed of the material through the outlet of its respective compartment.

2. In a seed crusher and distributer, a wheeled frame, a two compartment hopper carried thereby, each compartment being provided with a discharge outlet, a feed roll provided with a plurality of radial teeth mounted within each outlet of the compartments, a pair of feed crushing rolls disposed below the outlet of one of the compartments, one of said rolls being operated by a traction wheel, means for operably connecting the crushing rolls and the feeding rolls thereto, an adjustable plate one to each outlet disposed in coactive relation with its feed roll for regulating the feed of the material through the outlet of its respective compartment, and manually controlled means one to each of said plates for adjusting the plate and retaining the same in adjustment.

In testimony that I claim the foregoing as my own, I have hereto affixed my signature in the presence of two witnesses.

JOHN A. GARDNER.

Witnesses:
SELINA WILLSON,
W. H. C. CLARKE.

---

Copies of this patent may be obtained for five cents each, by addressing the "Commissioner of Patents, Washington, D. C."